UNITED STATES PATENT OFFICE 2,419,199

QUINOLINE COMPOUNDS AND PROCESS OF MAKING SAME

Joseph H. Burckhalter, Detroit, Albert L. Rawlins, Grosse Pointe Woods, Frank H. Tendick, Grosse Pointe Park, Eldon M. Jones, Grosse Pointe Woods, and Walter F. Holcomb, Detroit, Mich., assignors to Parke, Davis & Company, Detroit, Mich., a corporation of Michigan No Drawing. Application February 9, 1945, Serial No. 577,149

13 Claims. (Cl. 260—288)

This invention relates to a class of new chemical compounds having the general formula for the free base:

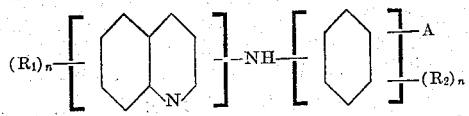

where $(R_1)_n$ represents $n$ substituents $R_1$, $n$ having one of the values 0, 1, 2 or 3, and $R_1$ is a substituent of the class consisting of halogen, —CN, —OH, —NO$_2$, lower alkyl, lower hydroxy alkyl, lower alkoxy, aryl, lower alkyl substituted aryl, amino, lower alkylamino, groups hydrolyzable to amino and lower alkylamino, lower dialkylamino, saturated heterocyclic secondary amines such as piperidine, pyrrolidine, morpholine and thiomorpholine, —COOH and esters and salts of —COOH. $(R_2)_n$ represents $n$ substituents $R_2$, $n$ having one of the values 0, 1, 2 or 3, and $R_2$ is a substituent of the class consisting of halogen, lower alkyl, aryl, —NO$_2$, amino, lower alkylamino, groups hydrolyzable to amino and lower alkylamino, lower dialkylamino, saturated heterocyclic secondary amines such as, piperidine, pyrrolidine, morpholine and thiomorpholine and the group A.

A in the above formula represents a group having the formula

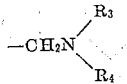

in which R$_3$ and R$_4$ may be hydrogen, an alkyl group (saturated or unsaturated), containing 1 to 6 carbon atoms, or a hydroxyl-alkyl group containing 1 to 6 carbon atoms; R$_3$ and R$_4$ may also be taken together with N to form a heterocyclic ring consisting of a member of the class piperidine, morpholine, thiomorpholine, piperazine, pyrrolidine and pyrrole.

The imino residue in said formula is attached to the quinoline nucleus at one of the positions 2 and 4.

These new compounds are useful therapeutic agents and intermediates for the same and, in general, they are characterized by their toxicity to protoza, particularly plasmodia. These new compounds may be used in the form of their free bases or in the form of their salts with inorganic and organic acids such as hydrochloric acid, sulfuric acid, phosphoric acid, sulfamic acid, acetic acid, lactic acid, tartaric acid, gluconic acid, citric acid, and alkyl sulfonic acids or as the insoluble salt of methylene disalicylic acid.

The new compounds of the invention may be prepared by the condensation of an aminomethylaniline of the general formula

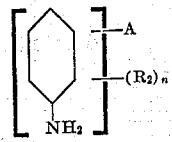

and a haloquinoline of the general formula

where A, R$_1$, R$_2$ and $n$ have the same significance as above and X is a halogen of the class chlorine and bromine which is substituted on one of the carbon atoms of the quinoline nucleus in position 2 or 4.

The condensation may be carried out by reacting equimolar portions of an aminomethylaniline and a haloquinoline with or without a solvent. The reaction may be carried out in alkaline, neutral or acid media but we prefer to carry out the condensation in aqueous or alcoholic solution in the presence of an organic acid or a dilute mineral acid.

The following specific examples illustrate this invention but do not, however, limit it thereto.

*Example 1.—4-(2'-diethylaminomethylanilino)-7-chloroquinoline dihydrochloride*

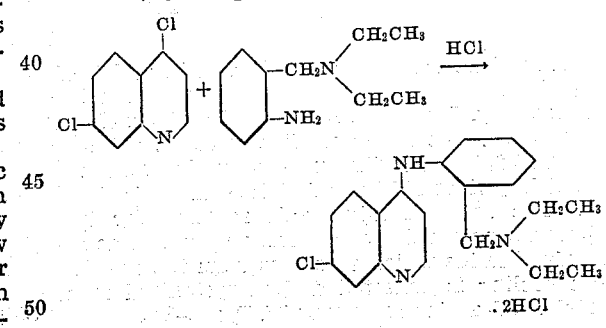

5 g. (0.028 mole) of 2-(diethylaminomethyl)-aniline [Bull. Soc. Chim., (4), 19, 339 (1916)] and 5.9 g. (0.038 mole) of 4,7-dichloroquinoline are dissolved in 125 cc. of absolute ethanol. The pH of the solution is adjusted to 3 by the addition of concentrated hydrochloric acid and the mixture refluxed for two hours. The solution is concentrated, acetone added and the mixture cooled. The dihydrochloride which separates is collected and recrystallized methanol-acetone mixture.

*Example 2.—4-(3'-diethylaminomethylanilino)-7-chloroquinoline dihydrochloride*

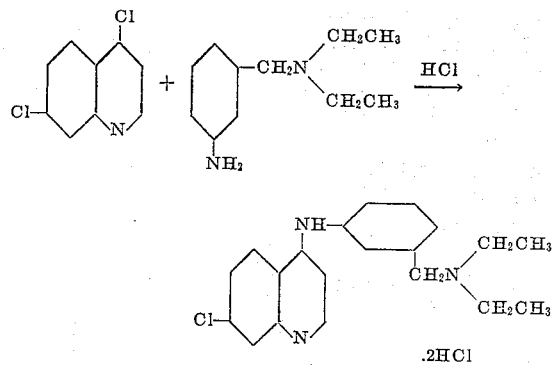

6.2 g. (0.034 mole) of 3-(diethylaminomethyl)-aniline [Bull. Soc. Chim., (4), 19, 339 (1916)] and 6.5 g. (0.033 mole) of 4,7-dichloroquinoline are dissolved in 125 cc. of absolute ethanol. The pH of the solution is adjusted to 3 by the addition of concentrated hydrochloric acid and the mixture refluxed for two hours. The solution is evaporated, acetone added and the mixture cooled. The dihydrochloride dihydrate which separates is collected and recrystallized from isopropanol; M. P. 127–8° C.

*Example 3.—4-(4'-diethylaminomethylanilino)-7-chloroquinoline dihydrochloride*

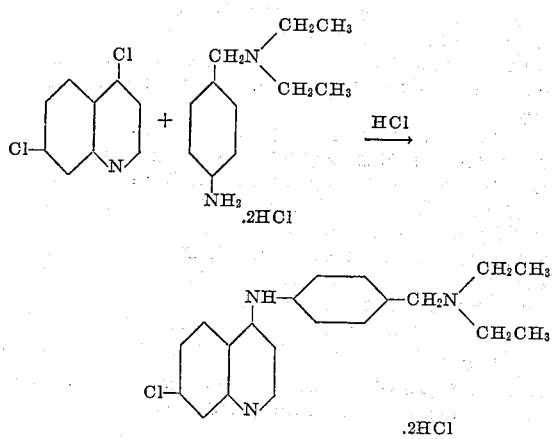

A mixture consisting of 2.6 g. (0.01 mole) of 4-(diethylaminomethyl)aniline dihydrochloride [Proc. Roy. Soc., 108B, 130 (1931)] and 2 g. (0.095 mole) of 4,7-dichloroquinoline in 50 cc. absolute ethanol is treated with concentrated hydrochloric acid dropwise until the pH of the solution is about 3. The reaction mixture is refluxed for two hours, concentrated and acetone added. The dihydrochloride which separates from the solution on cooling is collected and recrystallized from methanol-acetone mixture; M. P. 260–1° C.

*Example 4.—4-(3'-N-piperidylmethylanilino)-7-chloroquinoline dihydrochloride*

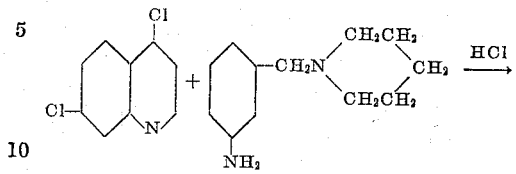

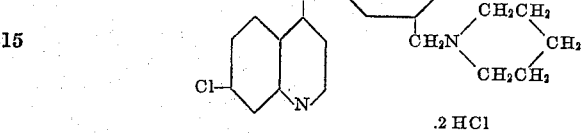

4.5 g. (0.024 mole) of 3-(N-piperidylmethyl)-aniline [prepared by the reaction of 3-nitrobenzyl chloride and piperidine and subsequent reduction of the nitro group] and 5 g. (0.024 mole) of 4,7-dichloroquinoline are dissolved in 100 cc. of absolute ethanol. The pH of the solution is adjusted to about 3 by the addition of concentrated hydrochloric acid and the mixture refluxed for two hours. The solution is concentrated, acetone added and the mixture cooled. The crystalline dihydrochloride is removed by filtration and recrystallized from methanol-acetone mixture.

*Example 5.—4-(2',5'-di-N-piperidylmethylanilino)-7-chloroquinoline trihydrochloride*

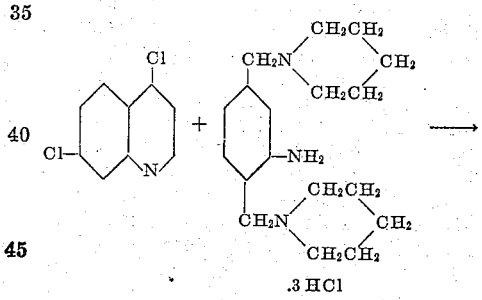

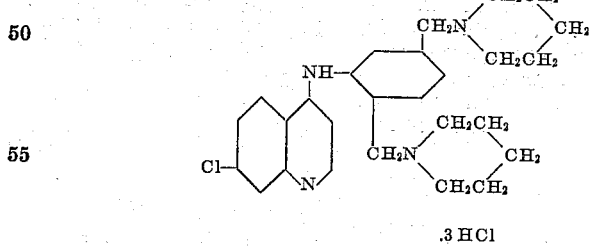

A mixture consisting of 6.5 g. (0.016 mole) of 2,5-di-N-piperidylmethylaniline trihydrochloride [prepared by the reaction of 1,4-dichloromethyl-2-nitrobenzene (Comp. rend., 73, 1385 (1871)) and piperidine and subsequent reduction of the nitro group] and 3.25 g. (0.016 mole) of 4,7-dichloroquinoline in 50 cc. of water is heated on a steam bath for two hours. The solution is cooled, made alkaline with ammonium hydroxide, and extracted with several portions of chloroform. The combined chloroform extract is dried over anhydrous potassium carbonate, filtered and the filtrate treated with an excess of dry, gaseous hydrogen chloride. The solvent is decanted, and the crude trihydrochloride recrystallized from methanol-acetone mixture.

*Example 6.—4-(2'-chloro-5'-diethylaminomethylanilino)-7-chloroquinoline dihydrochloride*

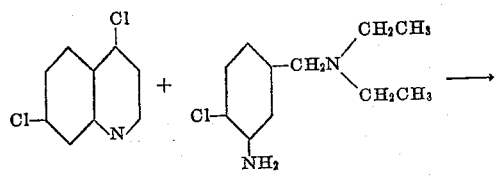

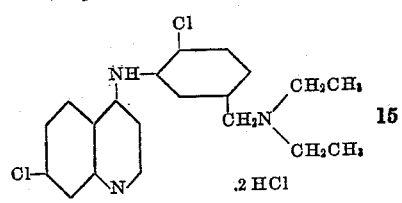

5.05 g. (0.024 mole) of 2-chloro-5-(diethylaminomethyl)-aniline and 5 g. (0.024 mole) of 4,7-dichloro-quinoline are dissolved in 100 cc. of absolute ethanol. The pH of the solution is adjusted to about 3 by the addition of concentrated hydrochloric acid and the mixture refluxed for two hours. The solution is concentrated, acetone added and the mixture cooled. The crystalline dihydrochloride is removed by filtration and recrystallized from methanol-acetone mixture.

*Example 7.—4-(2'-diethylaminomethyl-5'-chloroanilino)-7-chloroquinoline dihydrochloride*

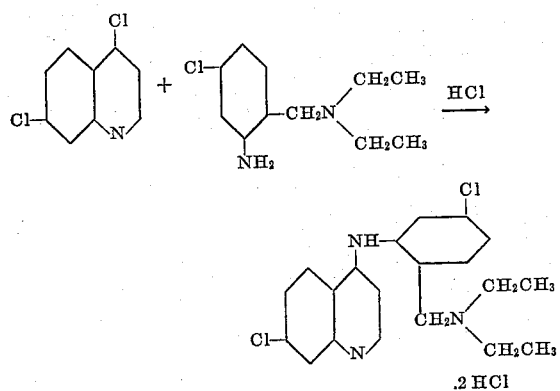

6.5 g. (0.031 mole) of 2-diethylaminomethyl-5-chloroaniline and 6.45 g. (0.031 mole) of 4,7-dichloroquinoline are dissolved in 100 cc. of absolute ethanol. The pH of the solution is adjusted to about 3 by the addition of concentrated hydrochloric acid and the mixture refluxed for two hours. The solution is concentrated, acetone added and the mixture cooled. The crystalline dihydrochloride is removed by filtration and recrystallized from methanol-acetone mixture.

*Example 8.—4-(3'-N-morpholinylmethylanilino)-6-methoxy-quinoline dihydrochloride*

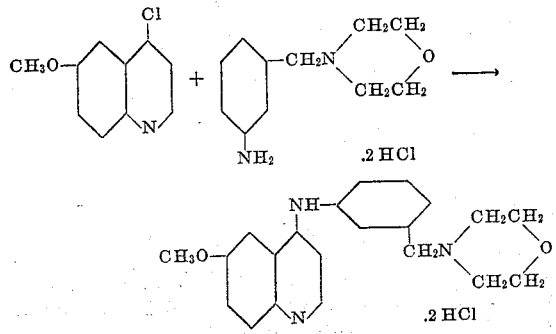

6.0 g. (0.023 mole) of 3-(N-morpholinylmethyl)aniline dihydrochloride and 4.67 g. (0.023 mole) of 4-chloro-6-methoxy-quinoline are dissolved in 100 cc. of absolute ethanol. The pH of the solution is adjusted to about 3 by the addition of concentrated hydrochloric acid and the resulting solution heated on a steam bath for two hours. The solution is evaporated, acetone added until turbidity is noted and the solution cooled. The dihydrochloride is collected and recrystallized from methanol-ethyl acetate mixture.

*Example 9.—4-(3'-N-thiomorpholinylmethylanilino)-6-methoxy-quinoline dihydrochloride*

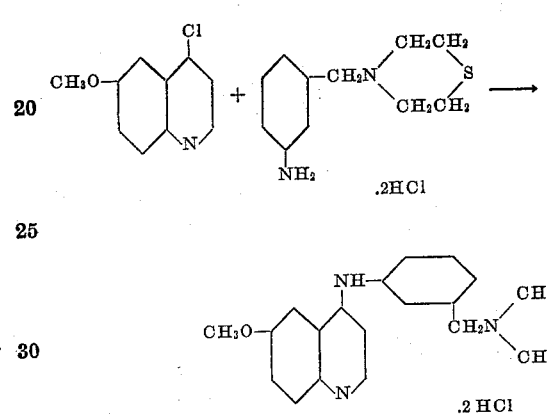

7.5 g. (0.027 mole) 3-(N-thiomorpholinylmethyl)-aniline dihydrochloride and 5.5 g. (0.027 mole) of 4-chloro-6-methoxy-quinoline are dissolved in 85 cc. of absolute ethanol. The pH of the solution is adjusted to about 3 by the addition of concentrated hydrochloric acid and the resulting solution heated on a steam bath for two hours. The solution is evaporated, acetone added until turbidity is noted and the solution cooled. The dihydrochloride is collected and recrystallized from methanol-ethyl acetate mixture.

*Example 10.—3-methyl-4-(3'-N-piperidylmethylanilino)-7-chloro-quinoline dihydrochloride*

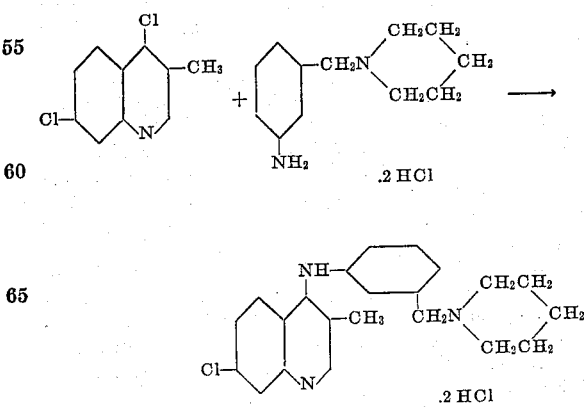

7.0 g. (0.026 mole) 3-(N-piperidylmethyl)aniline dihydrochloride and 5.96 g. (0.026 mole) of 3-methyl-4,7-dichloro-quinoline are dissolved in 100 cc. of absolute ethanol. The pH of the solution is adjusted to about 3 by the addition of concentrated hydrochloric acid and the resulting solution heated on a steam bath for two hours. The solution is evaporated, acetone added until the solution is turbid and the solution cooled. The dihydrochloride is collected and recrystallized from methanol-acetone mixture.

*Example 11.— 3-methyl-4-(3'-aminomethylanilino)-7-chloroquinoline dihydrochloride*

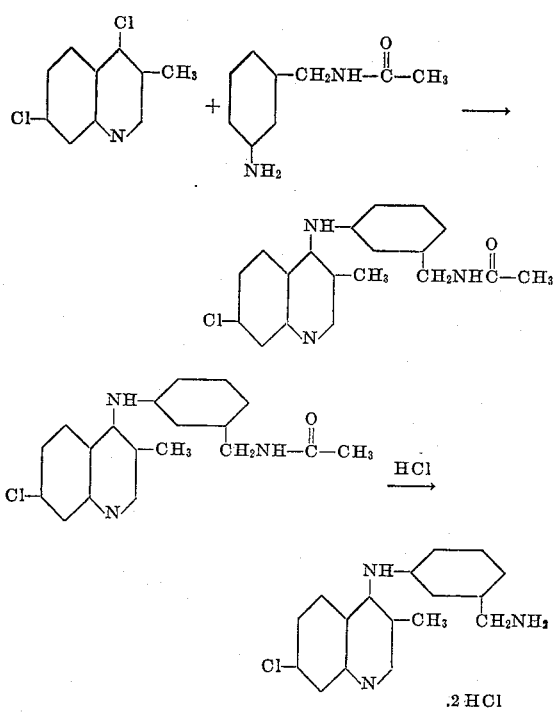

7.5 g. (0.05 mole) of 3-(acetylaminomethyl)-aniline and 12 g. (0.05 mole) of 3-methyl-4,7-dichloroquinoline are suspended in a mixture of 50 cc. of water and 50 cc. of dioxane. The pH of the mixture is adjusted to 4 by the addition of concentrated hydrochloric acid and the acidified mixture heated on a steam bath for two hours. The solution is cooled, made alkaline with ammonium hydroxide and the crude 3-methyl-4-(3'-acetylaminomethylanilino)-7-chloroquinoline which separates removed by filtration and washed with water.

12.5 g. (0.037 mole) of crude 3-methyl-4-(3'-acetylaminomethylanilino)-7-chloroquinoline and 50 cc. of 6 N hydrochloric acid are heated on a steam bath for six hours. The solution is cooled, made alkaline with 5 N sodium hydroxide solution and extracted with chloroform. The combined chloroform extract is dried over anhydrous magnesium sulfate, the drying agent removed by filtration and the chloroform filtrate treated with excess dry, gaseous hydrogen chloride. The gummy dihydrochloride which separates is crystallized by rubbing with a glass rod, collected and recrystallized from absolute ethanol-acetone mixture.

This same compound, 3-methyl-4-(3'-aminomethylanilino) - 7 - chloroquinoline dihydrochloride, may also be prepared directly by the reaction of 3-(aminomethyl)aniline and 3-methyl-4,7-dichloroquinoline in the presence of dilute hydrochloric acid.

*Example 12.—4-(4' - ethylaminomethylanilino)-6-methylquinoline dihydrochloride*

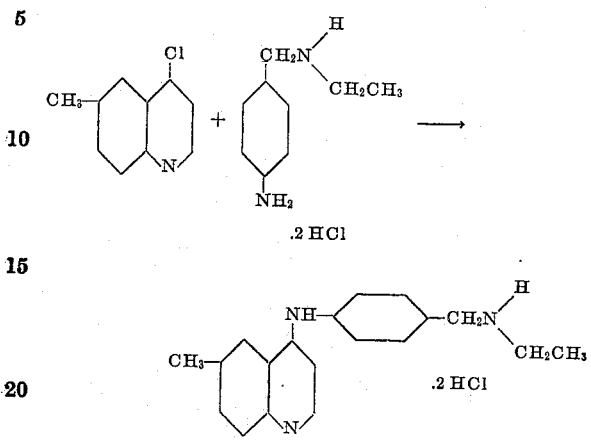

5.6 g. (0.025 mole) of 4-(ethylaminomethyl)-aniline dihydrochloride and 4.75 g. (0.025 mole) of 4-chloro-6-methylquinoline are dissolved in 85 cc. of absolute ethanol. The pH of the solution is adjusted to about 3 by the addition of concentrated hydrochloric acid and the resulting solution heated on a steam bath for two hours. The solution is evaporated, acetone added until the solution is turbid and the solution cooled. The dihydrochloride is collected and recrystallized from methanolacetone mixture.

*Example 13.—2-methyl-4-(3'-N-piperazylmethylanilino)-6-methoxyquinoline trihydrochloride*

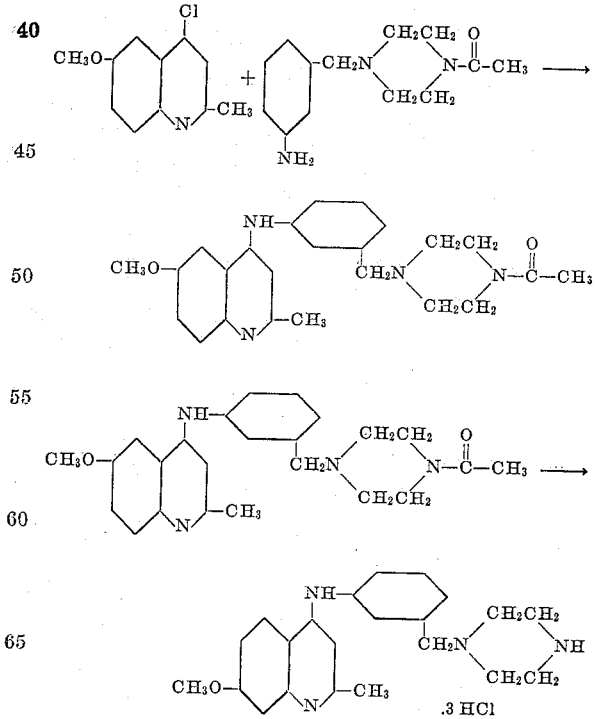

A mixture consisting of 7.5 g. (0.032 mole) of 3 - (N - acetylpiperazylmethyl)aniline and 7.06 (0.032 mole) of 2-methyl-4-chloro-6-methoxyquinoline in a solution of 50 cc. of water and 50 cc. of dioxane is acidified to a pH of about 4 with concentrated hydrochloric acid. The resulting acidified mixture is heated on a steam bath for two hours, cooled and made alkaline with ammonium hydroxide. The precipitated mono-acetate of 2-methyl - 4 - (3'- N - piperazylmethylanilino) -6-methoxyquinoline is removed by filtration and washed with water.

10 g. (0.024) mole) of 2-methyl-4-(3'-N-acetylpiperazylmethylanilino)-6-methoxyquinoline and 50 cc. of 6 N hydrochloric acid are heated on a steam bath for four to six hours, cooled, the reaction mixture made alkaline with ammonium hydroxide and extracted with chloroform. The combined chloroform extract is dried over anhydrous magnesium sulfate, filtered and the filtrate treated with an excess of dry, gaseous hydrogen chloride. The crude trihydrochloride is collected and recrystallized from methanol-acetone mixture.

This same compound, 2-methyl-4-(3'-N-piperazylmethylanilino)-6-methoxyquinoline trihydrochloride, may also be prepared directly by the reaction of 3-(N-piperazylmethyl)aniline and 2-methyl-4-chloro-6-methoxyquinoline in the presence of dilute hydrochloric acid.

*Example 14.—4-(3'-diethylaminomethylanilino) - 6-nitroquinoline dihydrochloride*

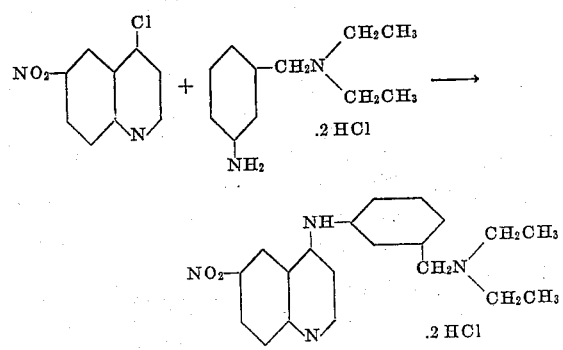

7.5 g. (0.03 mole) of 3-(diethylaminomethyl)-aniline dihydrochloride and 6.6 g. (0.03 mole) of 4-chloro-6-nitroquinoline are dissolved in 125 cc. of absolute ethanol. The pH of the solution is adjusted to about 3 by the addition of concentrated hydrochloric acid and the resulting solution heated on a steam bath for two hours. The solution is evaporated, acetone added until the solution is turbid and the solution cooled. The dihydrochloride is collected and recrystallized from methanol-acetone mixture.

*Example 15.—4-(3'-diethylaminomethylanilino) - 6-aminoquinoline trihydrochloride*

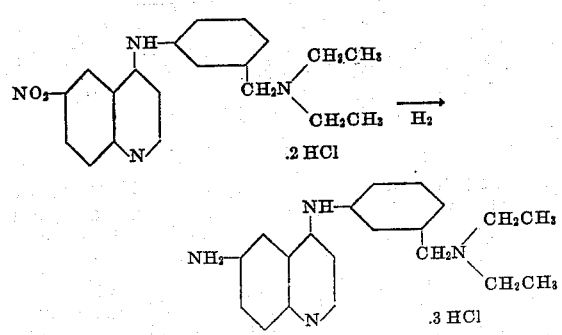

10 g. (0.023 mole) of 4-(3'-diethylaminomethylanilino)-6-nitroquinoline dihydrochloride is dissolved in 150 cc. of absolute ethanol and catalytically reduced with hydrogen and platinum oxide catalyst. When the theoretical of hydrogen is absorbed, the catalyst is removed by filtration, the filtrate concentrated and treated with an excess of dry hydrogen chloride in absolute ethanol. The mixture is warmed and enough acetone added to effect incipient crystallization. After cooling, the crystalline trihydrochloride is removed by filtration and recrystallized from absolute ethanol-acetone mixture.

*Example 16.—4-(3'-diethylaminomethylanilino) - 8-nitroquinoline dihydrochloride*

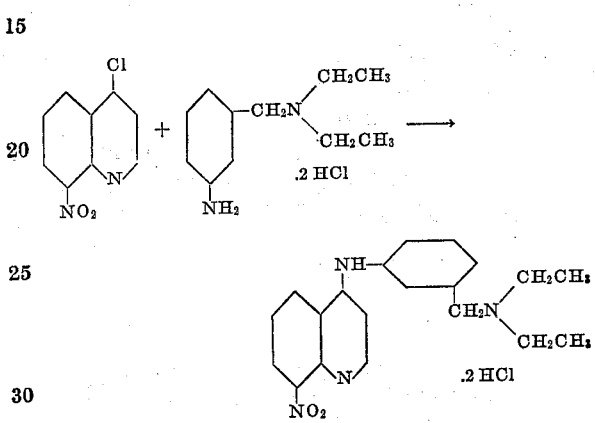

7.5 g. (0.03 mole) of 3-(diethylaminomethyl)-aniline dihydrochloride and 6.6 g. (0.03 mole) of 4-chloro-8-nitroquinoline are dissolved in 125 cc. of absolute ethanol. The pH of the solution is adjusted to about 3 by the addition of concentrated hydrochloric acid and the resulting solution heated on a steam bath for two hours. The solution is evaporated, acetone added until the solution is turbid and the solution cooled. The dihydrochloride is collected and recrystallized from methanol-acetone mixture.

*Example 17.—4-(3'-diethylaminomethylanilino) - 8-aminoquinoline trihydrochloride*

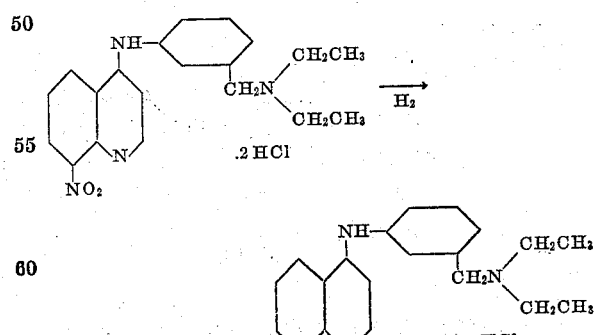

10 g. (0.023 mole) of 4-(3'-diethylaminomethylanilino)-8-nitroquinoline dihydrochloride is dissolved in 150 cc. of absolute ethanol and catalytically reduced with hydrogen and platinum oxide catalyst. When the theoretical of hydrogen is absorbed, the catalyst is removed by filtration, the filtrate concentrated and treated with an excess of dry hydrogen chloride in absolute ethanol.

The mixture is warmed and enough acetone added to effect incipient crystallization. After cooling, the crystalline trihydrochloride is removed by filtration and recrystallized from absolute ethanol-acetone mixture.

*Example 18.—4-(4'-N-piperidylmethylanilino)-5-nitroquinoline dihydrochloride*

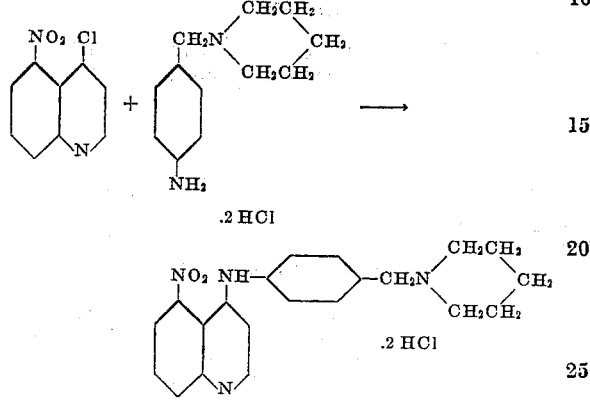

7.5 g. (0.028 mole) of 4-(N-piperidylmethyl)-aniline dihydrochloride and 6.3 g. (0.028 mole) of 4-chloro-5-nitroquinoline are dissolved in 125 cc. of absolute ethanol. The pH of the solution is adjusted to about 3 by the addition of concentrated hydrochloric acid and the resulting solution heated on a steam bath for two hours. The solution is evaporated, acetone added and the solution cooled. The dihydrochloride is collected and recrystallized from methanol-acetone mixture.

*Example 19.—4-(4'-N-piperidylmethylanilino)-5-aminoquinoline trihydrochloride*

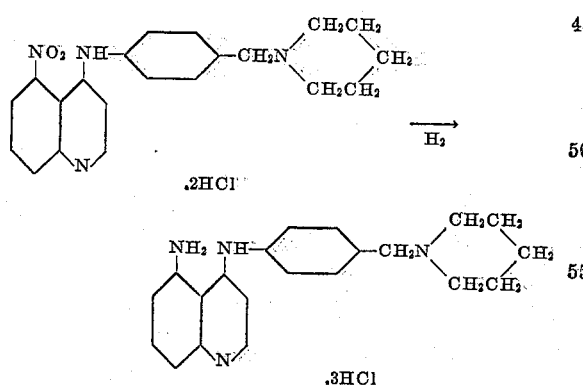

10 g. (0.022 mole) of 4-(4'-N-piperidylmethylanilino)-5-nitroquinoline dihydrochloride is dissolved in 150 cc. of absolute ethanol and catalytically reduced with hydrogen and platinum oxide catalyst. When the theoretical of hydrogen is absorbed, the catalyst is removed by filtration, the filtrate concentrated and treated with an excess of dry hydrogen chloride in absolute ethanol. The mixture is warmed and enough acetone added to effect incipient crystallization. After cooling, the crystalline trihydrochloride is removed by filtration and recrystallized from absolute ethanol-acetone mixture.

*Example 20.—2-(3'-diethylaminoanilino)-quinoline dihydrochloride*

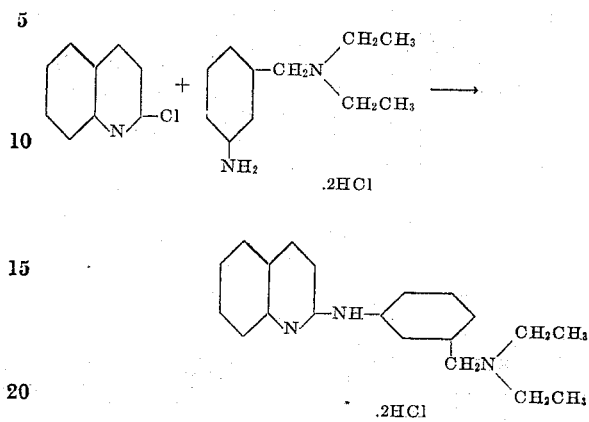

5 g. (0.02 mole) of 3-(diethylaminomethyl)aniline dihydrochloride and 3.5 g. (0.02 mole) of 2-chloroquinoline are dissolved in 35 cc. water and 35 cc. of dioxane. The pH of the solution is adjusted to about 3 by the addition of concentrated hydrochloric acid and then the mixture is refluxed for six hours. After cooling, the solution is made alkaline with ammonium hydroxide and extracted with chloroform. The combined chloroform extract is dried over anhydrous magnesium sulfate, filtered and an excess of dry, gaseous hydrogen chloride is admitted to the filtrate. The crude dihydrochloride which separates is collected and recrystallized from methanol-ethyl acetate mixture.

*Example 21.—2-(2'-N-piperidylmethylanilino)-4-methylquinoline dihydrochloride*

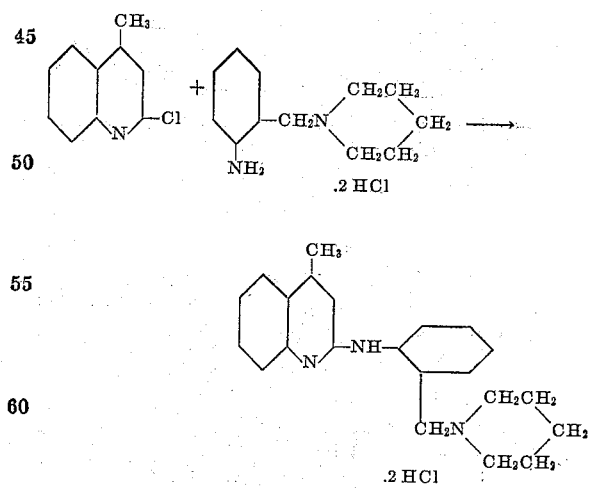

A mixture consisting of 6.5 g. (0.025 mole) of 2-(N-piperidylmethyl)aniline dihydrochloride and 4.66 g. (0.025 mole) of 2-chloro-4-methylquinoline is dissolved in 100 cc. of absolute ethanol. The pH of the solution is adjusted to about 3 by the addition of concentrated hydrochloric acid and the resulting solution heated on a steam bath for six hours. The solution is evaporated, acetone added until the solution is turbid and the solution cooled. The dihydrochloride is collected

Example 22.—2-(3'-di-n-propylaminomethylanilino)-6-methoxy-quinoline dihydrochloride

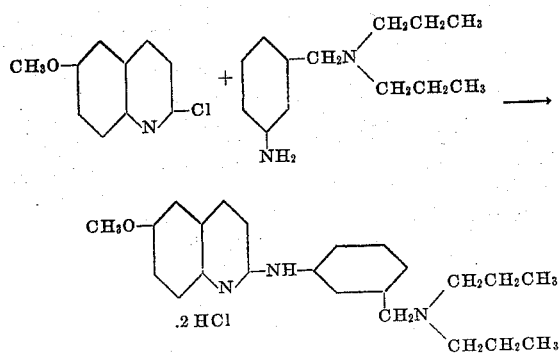

A mixture consisting of 6.0 g (0.021) mole) of 3-(di-n-propylaminomethyl) aniline and 4.4 g. (0.021 mole) of 2-chloro-6-methoxyquinoline is dissolved in 75 cc. of absolute ethanol. The pH of the solution is adjusted to about 3 by the addition of concentrated hydrochloric acid and the resulting solution heated on a steam bath for six hours. The solution is evaporated, acetone added and the solution cooled. The dihydrochloride is collected and recrystallized from methanol-acetone mixture.

Example 23.—2-(2'-diethylamino-3'-diethylaminomethyl-5'-nitroanilino)-5-methyl-7-chloroquinoline trihydrochloride

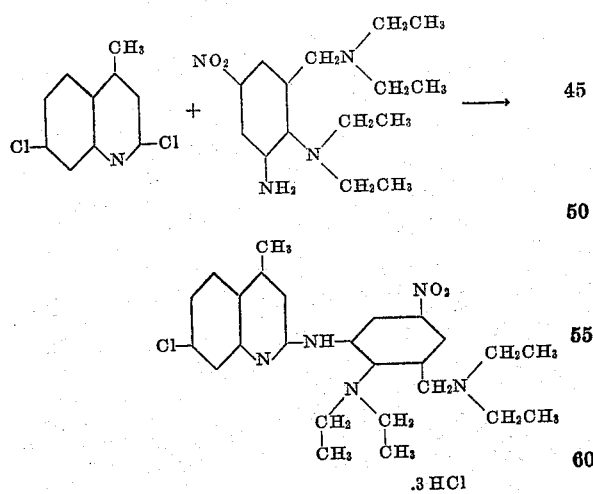

A mixture consisting of 7.5 g. (0.025 mole) of 2-diethylamino-3-(diethylaminomethyl) - 5 - nitraniline and 5.7 g. (0.025 mole) of 2,7-dichloro-4-methylquinoline is dissolved in 100 cc. of absolute ethanol. The pH of the solution is adjusted to about 3 by the addition of concentrated hydrochloric acid and the resulting solution heated on a steam bath for two hours. The solution is evaporated, acetone added until the solution is turbid and the solution cooled. The trihydrochloride is collected and recrystallized from methanol-acetone mixture.

Example 24.—2-(2'-chloro-5'-diethylaminomethylanilino)-7-chloroquinoline dihydrochloride

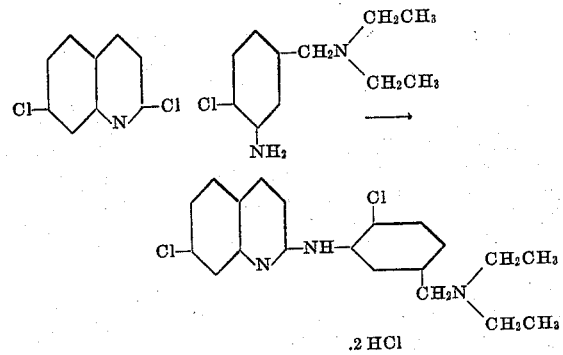

A mixture consisting of 5 g. (0.024 mole) of 2-chloro-5-(diethylaminomethyl) aniline and 4.95 g. (0.024 mole) of 2,7-dichloroquinoline is dissolved in 75 cc. of absolute ethanol. The pH of the solution is adjusted to about 3 by the addition of concentrated hydrochloric acid and the resulting solution heated on a steam bath for two hours. The solution is evaporated, acetone added and the solution cooled. The dihydrochloride is collected and recrystallized from methanol-acetone mixture.

Some additional examples which also serve to illustrate our invention and which may be prepared by the same methods described herein include the following:

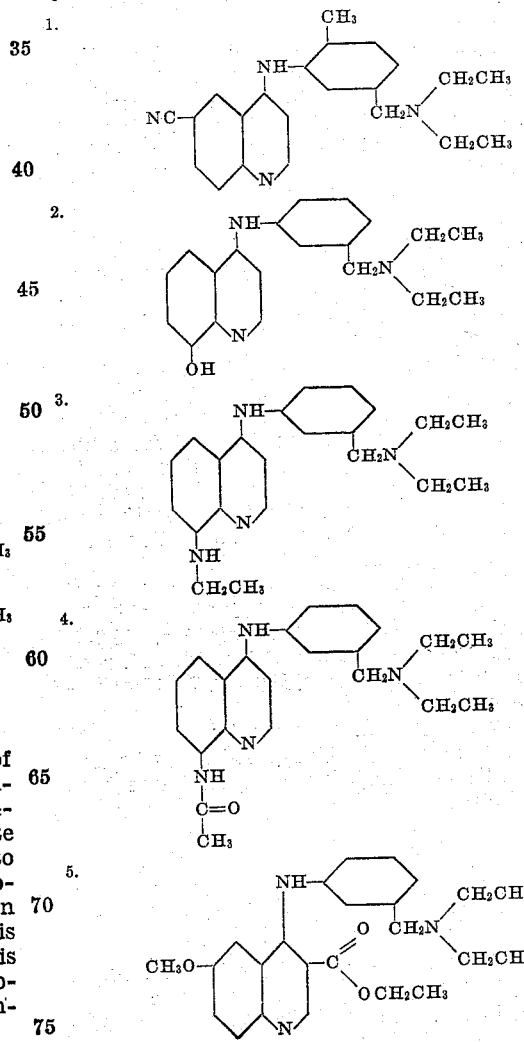

6.

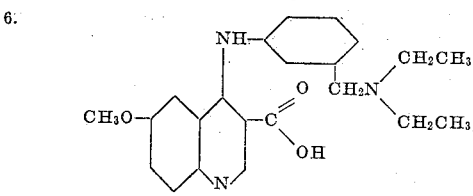

The intermediate substituted aminomethylanilines can be prepared by halogenation of the corresponding nitrotoluene with chlorine or bromine in the presence of light or with halogenating agents, such as, sulfuryl chloride in the presence of organic peroxides; reacting the nitrobenzyl halide with ammonia or an appropriate primary or secondary amine and reduction of the nitro group by known methods.

These substituted aminomethylanilines can also be prepared from an appropriately substituted benzyl alcohol by conversion of the aliphatic hydroxyl group to halogen; reaction of the halomethylaryl with ammonia or an appropriate primary or secondary amine; nitration of the substituted aminomethylbenzene and reduction of the nitro group by known methods.

The 4-haloquinolines used as intermediates can be prepared by the method of Magidson and Rubstov [J. Gen. Chem. (U. S. S. R.), 7, 1896 (1937); C. A., 32, 564 (1938)] or from the corresponding hydroxyquinolines which can be prepared by the method of Gould and Jacobs [J. Am. Chem. Soc., 61, 2890 (1939)] or by that of Theos J. Thompson [M. S. Thesis, University of Nebraska, July 24, 1942]. For the preparation of the 4-haloquinolines substituted in the 2-position such as 2-phenyl derivatives, the method of Knorr [Ann., 245, 378 (1888)] involving the reaction of aniline or substituted anilines with benzoyl acetic ester is used. The 3-substituted-4-hydroxyquinolines are prepared by the method given in United States Patent No. 2,233,970.

The various 2-haloquinolines intermediates can be prepared from the corresponding 2-hydroxyquinolines which are obtained by known methods such as the reduction of the corresponding o-nitrocinnamic acid or by employment of the Conrad-Limpack synthesis.

Attention is called to certain of applicants' copending applications which show and claim compounds having a structure somewhat resembling the compounds herein disclosed and claimed but differing therefrom in the fact that they contain hydroxylic substituents in the anilino radical. Among our copending applications relating to substituted amino-methyl-anilino quinoline compounds also containing hydroxylic substituents in the anilino radical are the following: Serial No. 556,496, filed September 29, 1944; Serial No. 576,900, filed February 8, 1945; Serial No. 626,906, filed November 5, 1945; Serial No. 626,907, filed November 5, 1945; Serial No. 626,908, filed November 5, 1945.

What we claim as our invention is:

1. A compound of the class consisting of a free base and its acid addition salts, said free base having the formula

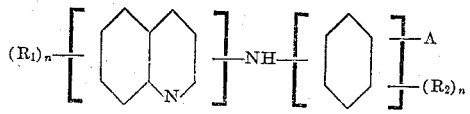

wherein the imino residue in said formula is attached to the quinoline nucleus at one of the positions two and four; $(R_1)_n$ represents $n$ substituents $R_1$, where $n$ has one of the values 0, 1, 2 and 3, and $R_1$ is a substituent of the class consisting of halogen, —CN, —OH, —NO$_2$, lower alkyl, lower hydroxy alkyl, lower alkoxy, aryl, lower alkyl substituted aryl, amino, lower alkylamino, groups hydrolyzable to amino and lower alkylamino, lower dialkylamino, piperidine, pyrrolidine, morpholine and thiomorpholine, —COOH and salts and esters of —COOH; $(R_2)_n$ represents $n$ substituents $R_2$, where $n$ has one of the values 0, 1, 2 and 3, and $R_2$ is a substituent selected from the class consisting of halogen, lower alkyl, aryl, —NO$_2$, the group A, amino, lower alkylamino, groups hydrolyzable to amino and lower alkylamino, lower dialkylamino, piperidine, pyrrolidine, morpholine and thiomorpholine; A represents a group having the formula

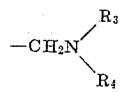

wherein $R_3$ and $R_4$ represent a substituent selected from the class consisting of hydrogen, saturated alkyl containing 1 to 6 carbon atoms, unsaturated alkyl containing 1 to 6 carbon atoms and hydroxyalkyl containing 1 to 6 carbon atoms, and further members in $R_3$ and $R_4$ taken together with N form a heterocyclic ring consisting of a member of the class piperidine, morpholine, thiomorpholine, piperazine, pyrrolidine and pyrrole.

2. A compound of the class consisting of a free base and its acid addition salts, said free base having the formula

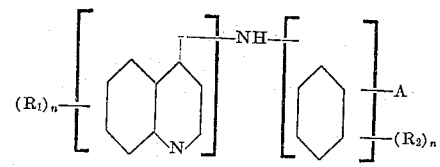

wherein $(R_1)_n$ represents $n$ substituents $R_1$, where $n$ has one of the values 0, 1, 2 and 3, and $R_1$ is a substituent of the class consisting of halogen, —CN, —OH, —NO$_2$, lower alkyl, lower hydroxy alkyl, lower alkoxy, aryl, lower alkyl substituted aryl, amino, lower alkylamino, groups hydrolyzable to amino and lower alkylamino, lower dialkylamino, piperidine, pyrrolidine, morpholine and thiomorpholine, —COOH and salts and esters of —COOH; $(R_2)_n$ represents $n$ substituents $R_2$, where $n$ has one of the values 0, 1, 2 and 3, and $R_2$ is a substituent selected from the class consisting of hydrogen, halogen, lower alkyl, aryl, —NO$_2$, the group A, amino, lower alkylamino, groups hydrolyzable to amino and lower alkylamino, lower dialkylamino, piperidine, pyrrolidine, morpholine and thiomorpholine; A represents a group having the formula

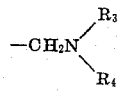

wherein $R_3$ and $R_4$ represent a substituent selected from the class consisting of hydrogen, saturated alkyl containing 1 to 6 carbon atoms, unsaturated alkyl containing 1 to 6 carbon atoms and hydroxyalkyl containing 1 to 6 carbon atoms, and further members in which $R_3$ and $R_4$ taken together with N form a heterocyclic ring consisting of a member of the class piperidine, morpholine, thiomorpholine, piperazine, pyrrolidine and pyrrole.

3. A compound having the formula,

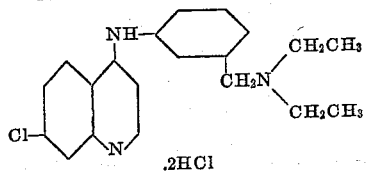

.2HCl

4. A compound having the formula,

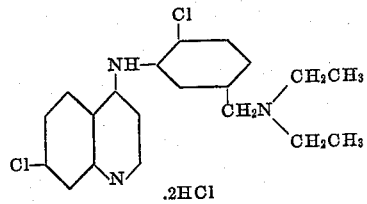

.2HCl

5. A compound having the formula,

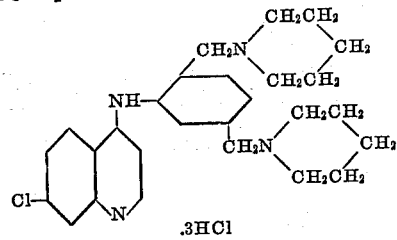

.3HCl

6. The process which consists in reacting the primary amino group of a compound having the formula,

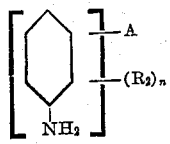

with the reactive halogen atom of a compound of the formula,

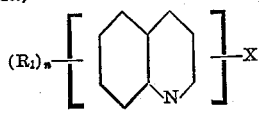

where X represents a halogen atom which is bound to one of the carbon atoms of the quinoline nucleus at one of the positions two and four and which is selected from the class consisting of chlorine, bromine and iodine; $(R_1)_n$ represents $n$ substituents $R_1$, where $n$ has one of the values 0, 1, 2 and 3, and $R_1$ is a substituent of the class consisting of halogen, —CN, —OH, —NO$_2$, lower alkyl, lower hydroxy alkyl, lower alkoxy, aryl, lower alkyl substituted aryl, amino, lower alkylamino, groups hydrolyzable to amino and lower alkylamino, lower dialkylamino, piperidine, pyrrolidine, morpholine and thiomorpholine, —COOH and salts and esters of —COOH; $(R_2)_n$ represents $n$ substituents $R_2$, where $n$ has one of the values 0, 1, 2 and 3, and $R_2$ is a substituent selected from the class consisting of halogen, lower alkyl, aryl, —NO$_2$, the group A, amino, lower alkylamino, groups hydrolyzable to amino and lower alkylamino, lower dialkylamino, piperidine, pyrrolidine, morpholine and thiomorpholine; A represent a group having the formula

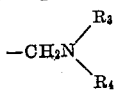

wherein R$_3$ and R$_4$ represent a substituent selected from the class consisting of hydrogen, saturated alkyl containing 1 to 6 carbon atoms, unsaturated alkyl containing 1 to 6 carbon atoms and hydroxyalkyl containing 1 to 6 carbon atoms, and further members in which R$_3$ and R$_4$ taken together with N form a heterocyclic ring consisting of a member of the class piperidine, morpholine, thiomorpholine, piperazine, pyrrolidine and pyrrole; thereby forming halogen halide and a compound having the formula

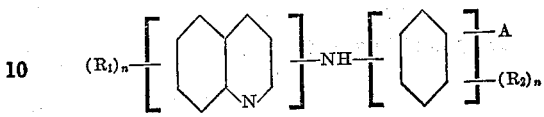

7. The process which consists in reacting the primary amino group of a compound having the formula,

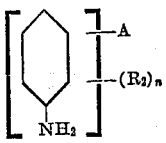

with the reactive halogen atom of a compound of the formula,

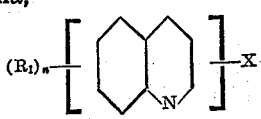

in the presence of an acid of the class consisting of dilute and concentrated organic acids and dilute inorganic acids, where X represents a halogen atom which is bound to one of the carbon atoms of the quinoline nucleus at one of the positions two and four and which is selected from the class consisting of chlorine, bromine and iodine; $(R_1)_n$ represents $n$ substituents $R_1$, where $n$ has one of the values 0, 1, 2 and 3, and $R_1$ is a substituent of the class consisting of halogen, —CN, —OH, —NO$_2$, lower alkyl, lower hydroxy alkyl, lower alkoxy, aryl, lower alkyl substituted aryl, amino, lower alkylamino, groups hydrolyzable to amino and lower alkylamino, lower dialkylamino, piperidine, pyrrolidine, morpholine and thiomorpholine, —COOH and salts and esters of —COOH; $(R_2)_n$ represents $n$ substituents $R_2$, where $n$ has one of the values 0, 1, 2 and 3, and $R_2$ is a substituent selected from the class consisting of halogen, lower alkyl, aryl, —NO$_2$, the group A, amino, lower alkylamino, groups hydrolyzable to amino and lower alkylamino, lower dialkylamino, piperidine, pyrrolidine, morpholine and thiomorpholine; A represents a group having the formula

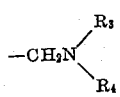

where R$_3$ and R$_4$ represent a substituent selected from the class consisting of hydrogen, saturated alkyl containing 1 to 6 carbon atoms, unsaturated alkyl containing 1 to 6 carbon atoms and hydroxyalkyl containing 1 to 6 carbon atoms, and further members in which R$_3$ and R$_4$ taken together with N form a heterocyclic ring consisting of a member of the class piperidine, morpholine, thiomorpholine, piperazine, pyrrolidine and pyrrole; thereby forming halogen halide and an acid addition salt of a compound having the formula,

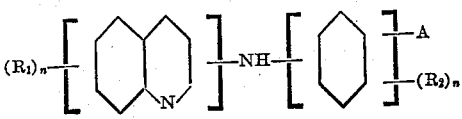

8. The process which consists in reacting a compound having the formula,

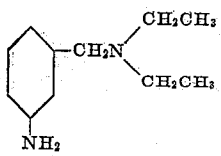

with a compound having the formula,

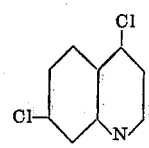

in the presence of an acid of the class consisting of dilute and concentrated organic acids and dilute inorganic acids thereby obtaining an acid addition salt of a compound having the formula,

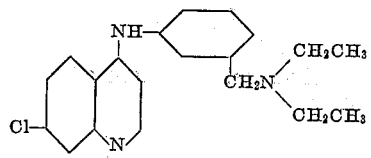

9. The process which consists in reacting a compound having the formula,

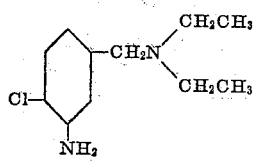

with a compound having the formula,

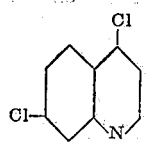

in the presence of an acid of the class consisting of dilute and concentrated organic acids and dilute inorganic acids thereby obtaining an acid addition salt of a compound having the formula,

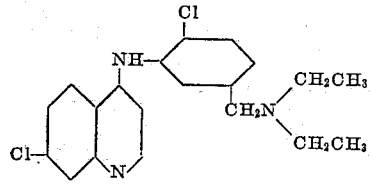

10. The process which consists in condensing a compound having the formula,

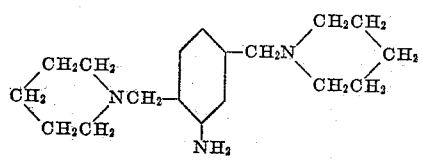

with a compound having the formula,

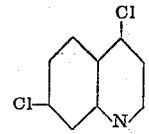

in the presence of an acid of the class consisting of dilute and concentrated organic acids and dilute inorganic acids thereby obtaining an acid addition salt of a compound having the formula,

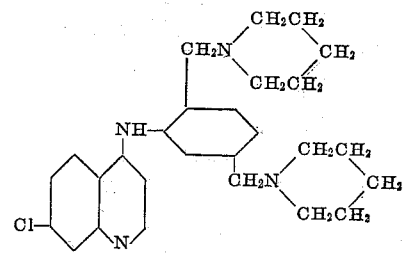

11. A compound of the class consisting of a free base and its acid addition salts, the free base of said compound having the formula,

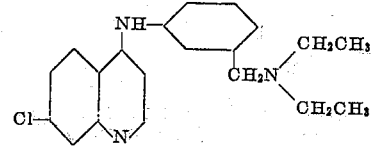

12. A compound of the class consisting of a free base and its acid addition salts, the free base of said compound having the formula,

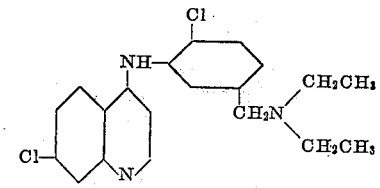

13. A compound of the class consisting of a free base and its acid addition salts, the free base of said compound having the formula,

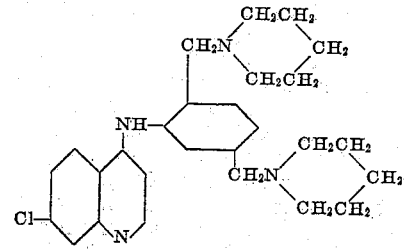

JOSEPH H. BURCKHALTER.
ALBERT L. RAWLINS.
FRANK H. TENDICK.
ELDON M. JONES.
WALTER F. HOLCOMB.